United States Patent
Brethour et al.

(10) Patent No.: US 6,181,355 B1
(45) Date of Patent: Jan. 30, 2001

(54) GRAPHICS PROCESSING WITH TRANSCENDENTAL FUNCTION GENERATOR

(75) Inventors: Vernon Brethour, Owens Cross Roads; Stacy Moore, Harvest, both of AL (US)

(73) Assignee: 3Dlabs Inc. Ltd., Hamilton (BM)

( * ) Notice: Under 35 U.S.C. 154(b), the term of this patent shall be extended for 0 days.

(21) Appl. No.: 09/354,083

(22) Filed: Jul. 15, 1999

Related U.S. Application Data

(60) Provisional application No. 60/093,185, filed on Jul. 17, 1998.

(51) Int. Cl.$^7$ ................................................ G06F 13/00
(52) U.S. Cl. ........................ 345/523; 345/522; 345/199
(58) Field of Search ........................................ 345/501, 507, 345/522–523, 508, 513, 503, 199; 358/518, 520, 523

(56) References Cited

U.S. PATENT DOCUMENTS

| | | | |
|---|---|---|---|
| 4,434,437 | 2/1984 | Strolle et al. | 358/140 |
| 4,615,013 | 9/1986 | Yan et al. | 364/521 |
| 4,646,232 | 2/1987 | Chang et al. | 523/445 |

(List continued on next page.)

FOREIGN PATENT DOCUMENTS

| | | | |
|---|---|---|---|
| 0 311 798 A2 | 4/1989 | (EP) | |
| 0 397 180 A2 | 11/1990 | (EP) | |
| 0 438 194 A2 | 7/1991 | (EP) | |
| 0 448 286 A2 | 9/1991 | (EP) | |
| 0 463 700 A2 | 1/1992 | (EP) | |
| 0 566 229 A2 | 10/1993 | (EP) | |
| 0 627 682 A1 | 12/1994 | (EP) | |
| 0 631 252 A2 | 12/1994 | (EP) | |
| 0637813 * | 2/1995 | (EP) | G06T/15/10 |
| 0 693 737 A2 | 1/1996 | (EP) | |
| 0 734 008 A1 | 9/1996 | (EP) | |
| 0 735 463 A2 | 10/1996 | (EP) | |
| 0 810 553 A2 | 12/1997 | (EP) | |
| 0 817 009 A2 | 1/1998 | (EP) | |
| 0 825 550 A2 | 2/1998 | (EP) | |
| 0 840 279 A2 | 5/1998 | (EP) | |
| WO 86/07646 | 12/1986 | (WO) | |
| WO 92/00570 | 1/1992 | (WO) | |
| WO 93/06553 | 4/1993 | (WO) | |
| WO 97/21192 | 6/1997 | (WO) | |

OTHER PUBLICATIONS

Iwashita, et al., "A Fine Grained Data Flow Machine and Its Concurrent Execution Mechanism" NEC Reg. & Develop., No. 93, Apr. 1989, pp. 63–72.

Fujita, et al., "A Dataflow Image Processing System TIP–4", Proceedings of the 5th International Conference on Image Analysis and Processing, pp. 735–741.

Rathman, et al., "Processing the New World of Interactive Media", IEEE Signal Processing Magazine 1053–5888/98/510.00 Copyright Mar. 1998, vol. 15, No. 2, XP–002121705, pp. 108–117.

IBM Technical Disclosure Bulletin "Effective Cache Mechanism for Texture Mapping" vol. 39, No. 12, Dec. 1996, XP–002065152, pp. 213, 215 and 217.

(List continued on next page.)

Primary Examiner—Kee M. Tung
(74) Attorney, Agent, or Firm—Groover & Associates; Robert Groover; Betty Formby

(57) ABSTRACT

A graphics processor for processing vertices of a polygon includes an input for receiving an instruction for processing a given vertex, memory for storing a first lookup table and a second lookup table, and an interpolation engine that, responsive to receipt of the instruction from the input, selects one of the lookup tables, determines table output from the one of the lookup tables, and produces an output value based upon the table output and data relating to the given vertex. Each of the first and second lookup tables may correspond to a selected function and contains table output as a function of an input value. The input value corresponds to data relating to the given vertex.

18 Claims, 3 Drawing Sheets

U.S. PATENT DOCUMENTS

| | | | |
|---|---|---|---|
| 4,908,780 | 3/1990 | Priem et al. | 364/521 |
| 4,918,626 | 4/1990 | Watkins et al. | 364/522 |
| 4,991,122 | 2/1991 | Sanders | 364/521 |
| 5,107,415 | 4/1992 | Sato et al. | 395/800 |
| 5,123,085 | 6/1992 | Wells et al. | 395/121 |
| 5,224,064 * | 6/1993 | Henry et al. | 708/440 |
| 5,239,654 | 8/1993 | Ing-Simmons et al. | 395/800 |
| 5,287,438 | 2/1994 | Kelleher | 395/132 |
| 5,293,480 | 3/1994 | Miller et al. | 395/163 |
| 5,313,551 | 5/1994 | Labrousse et al. | 395/425 |
| 5,363,475 | 11/1994 | Baker et al. | 395/122 |
| 5,371,840 | 12/1994 | Fischer et al. | 395/133 |
| 5,394,524 | 2/1995 | DiNicola et al. | 395/163 |
| 5,398,328 | 3/1995 | Weber et al. | 395/500 |
| 5,412,491 * | 5/1995 | Bachar | 358/500 |
| 5,446,479 | 8/1995 | Thompson et al. | 345/139 |
| 5,485,559 | 1/1996 | Sakaibara et al. | 395/133 |
| 5,511,165 | 4/1996 | Brady et al. | 395/200.01 |
| 5,519,823 | 5/1996 | Barkans | 395/143 |
| 5,544,294 | 8/1996 | Cho et al. | 395/141 |
| 5,555,359 | 9/1996 | Choi et al. | 395/141 |
| 5,557,734 | 9/1996 | Wilson | 395/162 |
| 5,561,749 | 10/1996 | Schroeder | 395/120 |
| 5,572,713 | 11/1996 | Weber et al. | 395/500 |
| 5,631,693 | 5/1997 | Wunderlich et al. | 348/7 |
| 5,664,114 | 9/1997 | Krech, Jr. et al. | 395/200.64 |
| 5,666,520 | 9/1997 | Fujita et al. | 345/513 |
| 5,684,939 | 11/1997 | Foran et al. | 395/131 |
| 5,701,365 | 12/1997 | Harrington et al. | 382/212 |
| 5,706,481 | 1/1998 | Hannah et al. | 395/519 |
| 5,721,812 | 2/1998 | Mochizuki | 395/110 |
| 5,737,455 | 4/1998 | Harrington et al. | 382/284 |
| 5,757,375 | 5/1998 | Kawase | 345/429 |
| 5,757,385 | 5/1998 | Narayanaswami et al. | 345/505 |
| 5,764,237 | 6/1998 | Kaneko | 345/430 |
| 5,821,950 | 10/1998 | Rentschler et al. | 345/505 |
| 5,841,444 | 11/1998 | Mun et al. | 345/506 |
| 5,870,567 | 2/1999 | Hausauer et al. | 395/281 |
| 5,883,641 | 3/1999 | Krech, Jr. et al. | 345/505 |
| 5,914,711 | 6/1999 | Mangerson et al. | 345/203 |
| 5,956,047 * | 9/1999 | Krech, Jr. et al. | 345/503 |

OTHER PUBLICATIONS

"Advanced Raster Graphics Architecture" XP–002118066, pp. 890–893.

IBM Technical Disclosure Bulletin "Data Format Conversion: Intel/Non–Intel", vol. 33, No. 1A, Jun. 1990, XP–000117784, pp. 420–427.

IBM Technical Disclosure Bulletin "Address Munging Support in a Memory Controller/PCI Host Bridge for the PowerPC 603 CPU Operating in 32–Bit Data Mode" vol. 38, No. 09, Sep. 1995, XP–000540250, pp. 237–240.

Auel, K., "One frame ahead: frame buffer management for animation and real–time graphics", Presented at Computer Graphics: Online Publications, Pinner, Middlesex, UK, 1988, XP–000749898, pp. 43–50.

Abram, et al., "Efficient Alias–free Rendering using Bit–masks and Look–up Tables", San Francisco, Jul. 22–26, vol. 19, No. 13, 1985, XP–002115680, pp. 53–59.

Schilling, A., "A New and Efficient Antialiasing with Sub-pixel Masks" XP–000562430, pp. 133–141.

Ueda, H., et al., "A Multiprocessor System Utilizing Enhanced DSP's For Image Processing", Central Research Laboratory, Hitachi, Ltd., 1988 IEEE, XP–2028756, pp. 611–620.

Cook, R.L., et al., "The Reyes Image Rendering Architecture", Computer Graphics, vol. 21, No. 4, Jul. 1987, XP–000561437, pp. 95–102.

Haeberli, P., et al., "The Accumulation Buffer: Hardware Support for High–Quality Rendering", Computer Graphics, vol. 24, No. 4, Aug. 1990, XP–000604382, pp. 309–318.

Watt, A., et al., "Advanced Animation and Rendering Techniques Theory and Practice", ACM Press, NY, pp. 127–137.

Carpenter, L., "The A–buffer, an Antialiased Hidden Surface Method", Computer Graphics, vol. 18, No. 3, Jul. 1984, pp. 13–18.

* cited by examiner

GRAPHICS PROCESSING WITH TRANSCENDENTAL FUNCTION GENERATOR

PRIORITY

This application claims priority from U.S. provisional patent application serial number 60/093,185, filed Jul. 17, 1998, entitled "GRAPHICS PROCESSING WITH TRANSCENDENTAL FUNCTION GENERATOR" and bearing attorney docket number 1247/A01, the disclosure of which is incorporated herein, in its entirety, by reference.

FIELD OF THE INVENTION

The invention generally relates to computer systems and, more particularly, the invention relates to processing graphics request data for display on a computer display device.

BACKGROUND OF THE INVENTION

Three dimensional graphics request data commonly is processed in a computer system as a plurality of polygons having vertices. Each of the vertices have associated attribute data (e.g., color, transparency, depth, etc . . . ) that is utilized to rasterize pixels on a computer display device.

Vertices commonly are subjected to a plurality of different types of geometry calculations prior to being rasterized. Common functions typically include addition and multiplication functions. Specialized geometry accelerators often are utilized to perform such functions. Additionally, some transcendental functions commonly are required in vertex processing. Such calculations, for example, may be to determine an inverse square root of a number, or 2 raised to a power. Many geometry accelerators include a lookup table for each transcendental or elementary used function. Each lookup table typically has accompanying interpolation hardware for enhancing the accuracy of the transcendental functions by interpolating the results of the lookup table.

SUMMARY OF THE INVENTION

In accordance with one aspect of the invention, a graphics processor for processing vertices of a polygon includes an input for receiving an instruction for a processing step, memory for storing a first lookup table and a second lookup table, and an interpolation engine that, responsive to receipt of the instruction from the input, selects one of the lookup tables, determines table output from the one of the lookup tables, and produces an output value based upon the table output and data relating to the given vertex. In preferred embodiments, each of the first and second lookup tables corresponds to a selected function and contains table output as a function of an input value. The input value corresponds to data relating to the given vertex.

In other embodiments, the graphics processor also includes a multiplexer for enabling the interpolation engine to couple to either of the first and second lookup tables. The graphics processor also may have a plurality of additional lookup tables, where the interpolation engine is selectively coupled with any of the first, second or additional lookup tables.

In accordance with other aspects of the invention, an apparatus for processing computer graphics requests includes a graphics request input, and a processor coupled to the graphics request input. The processor is responsive to instructions and has an output. Among other things, the processor preferably includes a transcendental function generator with a plurality of lookup tables, and an interpolator engine selectably coupled to one of the plurality of lookup tables. Each table preferably corresponds to a particular transcendental function and contains interpolation coefficients.

In preferred embodiments, the apparatus includes a multiplexer for enabling the interpolator engine to selectively couple to any one of the plurality of lookup tables.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
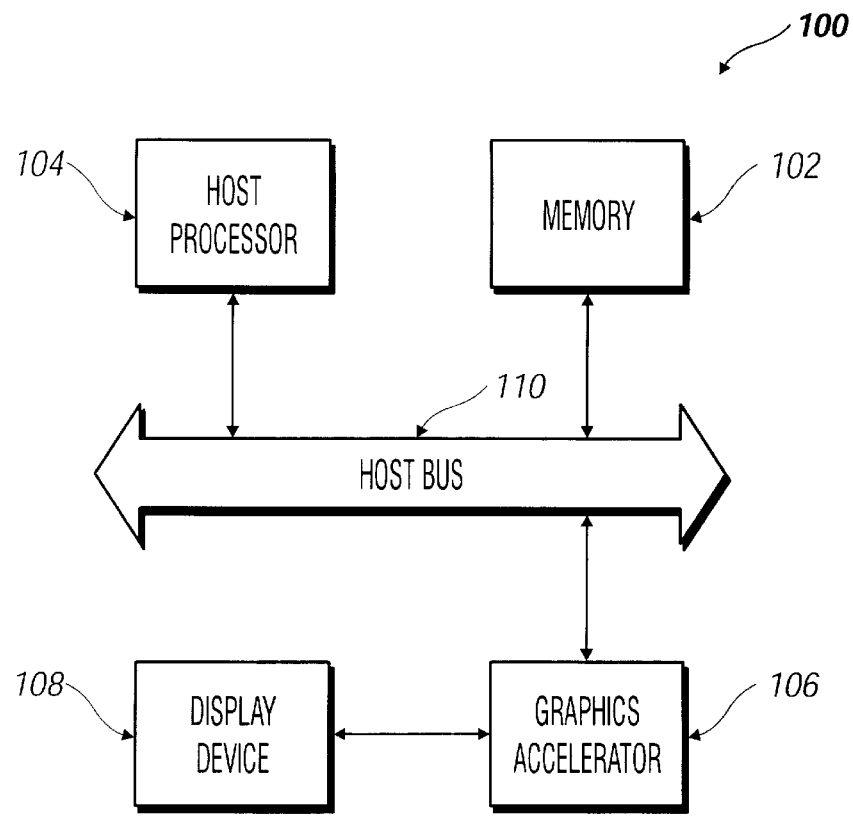
FIG. 1 schematically shows a portion of an exemplary computer system on which preferred embodiments of the invention may be implemented.

FIG. 1 shows a portion of an exemplary computer system 100 on which preferred embodiments of the invention may be implemented. More particularly, the computer system 100 includes a host processor 104 (i.e., a central processing unit) for executing application level programs and system functions, volatile host memory 102 for short term data storage (i.e., random access memory), a graphics accelerator 106 for processing graphics request code in accord with preferred embodiments of the invention (see FIG. 4), and a bus coupling all of the prior noted elements of the system 100. The system 100 further includes a display device 108 for displaying the graphics request code processed by the accelerator 106. The graphics accelerator 106 preferably utilizes any well known graphics processing application program interface such as, for example, the OPENGL™ application program interface (available from Silicon Graphics, Inc. of Mountain View, Calif.) for processing three dimensional ("3D") and two dimensional ("2D") graphical request code. In preferred embodiments, the host processor 104 executes a graphical drawing application program such as, for example, the PLANT DESIGN SYSTEM™ drawing program, available from Intergraph Corporation of Huntsville, Ala.

Figure 2:
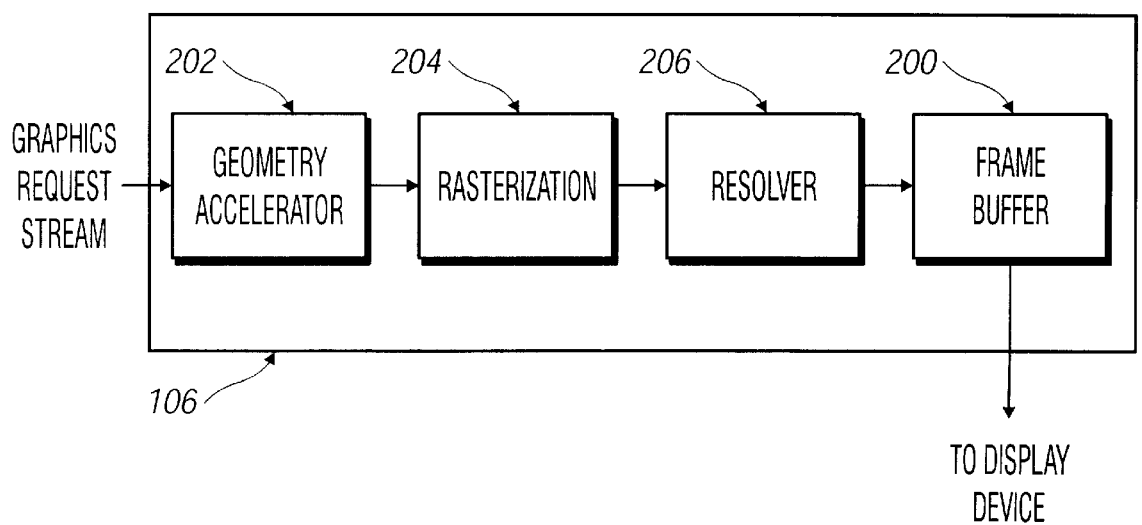
FIG. 2 schematically shows a preferred graphics accelerator that may be utilized in accord with preferred embodiments of the invention.

FIG. 2 shows several elements of the graphics accelerator 106. In preferred embodiments, the graphics accelerator 106 includes a double buffered frame buffer 200 (i.e., having a back buffer and a front buffer) for storing the processed graphics request code in accord with the OPENGL™ interface. Among other things, the graphics accelerator 106 also preferably includes a geometry accelerator 202 for performing geometry operations that commonly are executed in graphics processing, a rasterizer 204 for rasterizing pixels on the display device 108, and a resolver 206 for storing data in the frame buffer 200 and transmitting data from the frame buffer 200 to the display device 108. As noted above, the graphics accelerator 106 preferably is adapted to process both 2D and 3D graphical data. For more information relating to preferred embodiments of the graphics accelerator 106, see, for example, copending patent application entitled "WIDE INSTRUCTION WORD GRAPHICS PROCESSOR", filed on Jul. 15, 1999 and claiming priority from provisional patent application serial number 60/093,165, and copending U.S. patent application entitled "MULTI-PROCESSOR GRAPHICS ACCELERATOR", filed on Jul. 15, 1999 and claiming priority from provisional U.S. patent application serial number 60/093,247, the disclosures of which are incorporated herein, in there entireties, by reference.

Figure 3:
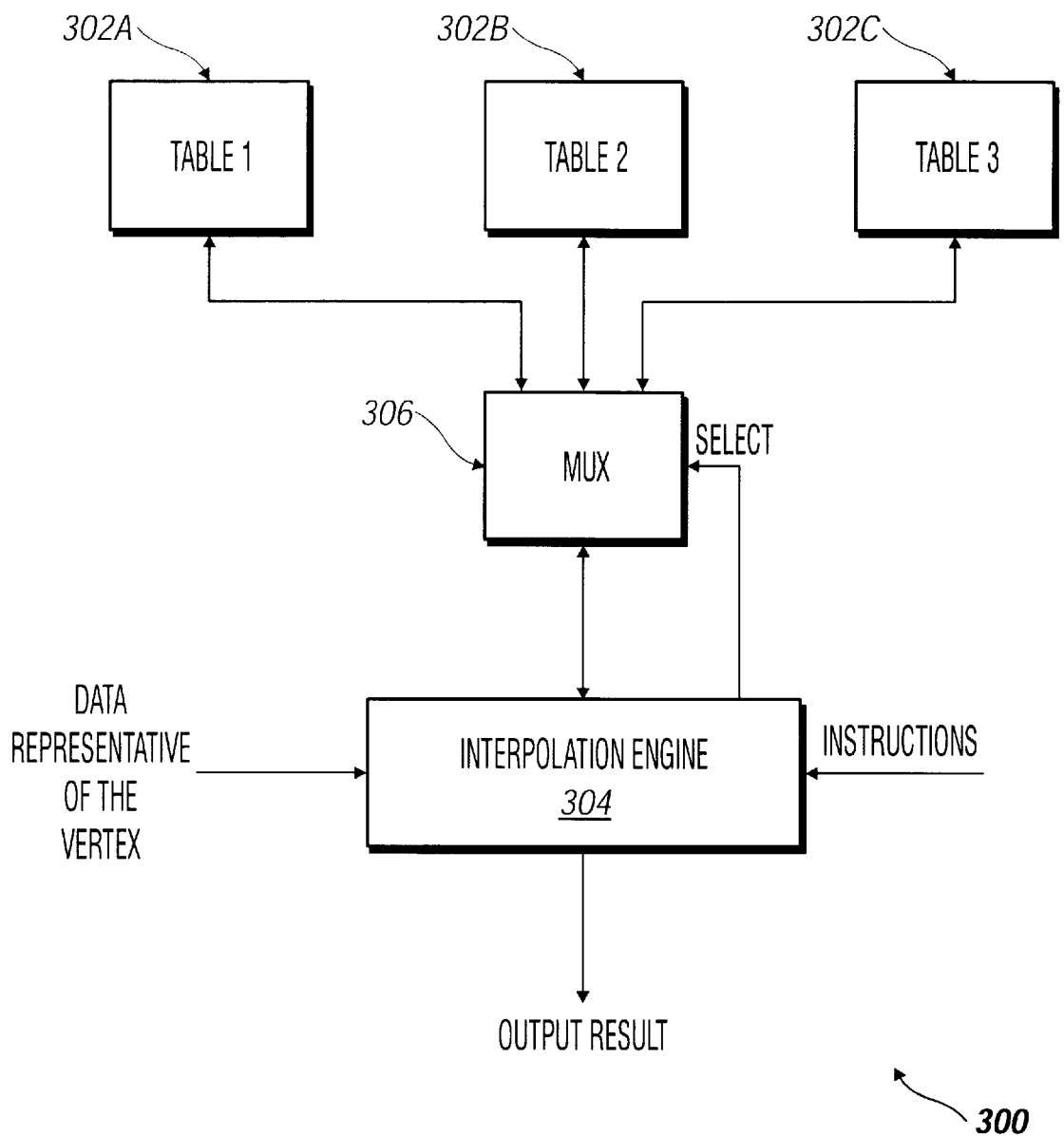
FIG. 3 shows a preferred embodiment of a transcendental function generator within a geometry accelerator shown in FIG. 2.

FIG. 3 shows a preferred embodiment of a transcendental function generator ("function generator 300") within the geometry accelerator 202 shown in FIG. 2. As is known to one skilled in the art, a transcendental function may be represented by the combination of elementary functions, such as addition and multiplication, in conjunction with coefficients values specific to the transcendental function. The function generator 300 includes first, second, and third lookup tables 302A, 302B, and 302C for producing output coefficient values based upon an input variable, an interpolation engine 304 for calculating an output value based upon the output coefficient values in selected ones of the lookup tables 302A–302C, and a multiplexer 306 for enabling the interpolation engine 304 to selectively couple with any one of the three lookup tables 302A–302C. The input variable preferably is a vertex data value such as, for example, an input lighting datum. The lookup tables are used to represent the output coeffiecents of the transcendental function. The interpolation engine includes hardware to perform elementary functions on the input variable and the output coefficients to form the output value. The geometry accelerator may use the transcendental function generator to perform lighting calculations, geometry transformations or clipping on the vetex data prior to the rasterization stage.

In preferred embodiments, each lookup table 302A–302C is directed to a different function. For example, the following lookup tables 302A–302C may be used to determine the following functions:

first lookup table 302A: $1/T^{1/2}$ (i.e., the inverse square root of the variable T);

second lookup table: 302B: $2^T$ (i.e., 2 raised to the power of the variable T); and third lookup table 302C: $\log_2 T$ (i.e., the log base 2 of the variable T).

It should be noted that although three functions are provided, other functions adaptable to graphics processing may be utilized in the lookup tables 302A–302C. In some embodiments, the lookup tables 302A–302C are stored in read only memory ("ROM") on the graphics accelerator. In a preferred embodiment, the lookup tables 302A–302C are stored in memory created gates. The term "lookup table" is utilized herein to describe any data structure for enabling data to be retrieved based upon input data. Accordingly, input data having a value of "1" should produce output coefficients that yield the value of "2" from the interpolation engine 304 when utilized in the second lookup table 302B. Each of the values calculated in the lookup tables 302A–302C preferably were calculated for a relatively small range of the input variable, thus controlling the size of the tables 302A–302C. In preferred embodiments of the invention, each table 302A–302C has sixty-four entries that each produce three output table values.

As discussed in greater detail below, the interpolation engine 304 receives processing instructions from another portion of the geometry accelerator, and responsively selects the appropriate lookup table 302A–302C via a select input of the multiplexer 306. Upon receipt of the output table data, the interpolation engine 304 calculates an output value by means of the output table value and the input data. In preferred embodiments, the interpolation engine 304 calculates an output value in accordance with the below quadratic formula:

$$Y=AX^2+BX+C \qquad \text{(Equation 1)}$$

where A, B, and C are coefficients produced by either one of the tables 302A–302C; and X is an input variable that is based upon data relating to the vertex being processed.

In alternative embodiments, the formula implemented by the interpolation engine 304 is a linear equation. In still other embodiments of the invention, the interpolation formula implemented is a cubic formula. Other embodiments include other formulas.

Figure 4:
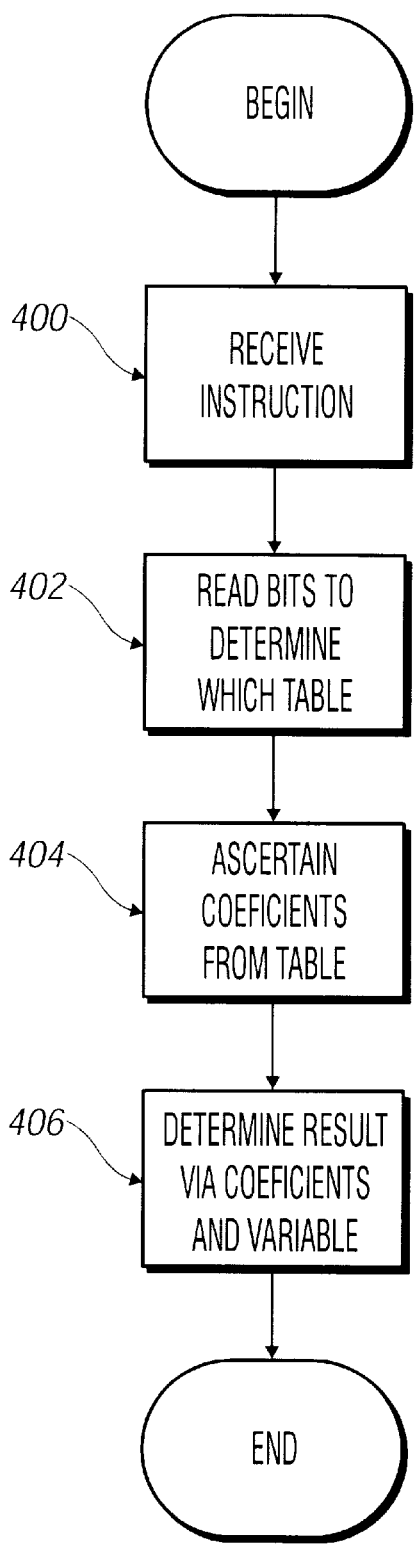
FIG. 4 shows a preferred method utilized by the transcendental function generator shown in FIG. 3 for producing output data.

FIG. 4 shows a preferred method utilized by the transcendental function generator 300 shown in FIG. 3 for producing output data. The process begins at step 400 in which an instruction is received by the interpolation engine 304 relating to a given vertex currently being processed. In preferred embodiments, the instruction is five bits of a wide word having at least 128 bits. Specifically, two bits are used to select the appropriate table, and three additional bits select the input argument from one of eight possible sources, ranging from the processor to a crossbar (not shown) or other bus. Among other things, the vertex may have some lighting data that is processed by the geometry accelerator at step 400.

The instruction preferably includes at least two lookup table bits that, when read by the interpolation engine 304, direct it to select one of the three lookup tables 302A–302C. For example, the bit sequence "00" may direct the engine 304 to the first table 302A, the bit sequence "01" may direct the engine 304 to the second table 302B, and the bit sequence "10" may direct the engine 304 to the third table 302C. Accordingly, the process continues to step 402 in which the interpolation engine 304 reads the two lookup table bits to determine which lookup table 302A–302C to access.

The process continues to step 404 in which the coefficients "A", "B", and "C" are ascertained from the selected lookup table 302A–302C. Three entries preferably are associated with the input variable entry in each lookup table 302A–302C. Accordingly, in preferred embodiments, the input variable is entered into all of the tables 302A–302C to produce respective sets of output variables "A", "B", and "C." The input variable is associated with the vertex data being processed. The interpolation engine 304 then selects the appropriate lookup table 302A–302C via the select input of the multiplexer 306, and then retrieves the set of coefficients from the output of such selected lookup table 302A–302C.

The process then continues to step 406 in which both the input variable and retrieved coefficients are utilized in equation 1 (above) by the interpolation engine 304 to calculate an output value.

In some embodiments, the individual tables 302A–302C may be implemented as different address ranges in a common addressable storage device. This effectively eliminates the need for the multiplexer 306 described above. In such case, the bits from the instruction word that select the table are simply incorporated into the table address. In some embodiments that do not utilize the multiplexer 306, the table access time undesirably may be slower.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A graphics processor for processing vertices of a polygon, the graphics processor comprising:

an input for receiving an instruction for processing a given vertex;

memory for storing a first lookup table and a second lookup table, each of the first and second lookup tables corresponding to a selected function and containing table output as a function of an input value, the input value corresponding to data relating to the given vertex; and an interpolation engine, responsive to receipt of the instruction from the input, selects one of the lookup tables, determines table output from the one of the lookup tables, and produces an output value based upon the table output and data relating to the given vertex.

2. The graphics processor as defined by claim 1 further including a multiplexer for enabling the interpolation engine to couple to either of the first and second lookup tables.

3. The graphics processor as defined by claim 1 further comprising a plurality of additional lookup tables, the interpolation engine being selectively coupled with any of the first, second or additional lookup tables.

4. The graphics processor as defined by claim 1 wherein the instruction is a wide word.

5. The graphics processor as defined by claim 4 wherein the wide word has at least 128 bits.

6. The graphics processor as defined by claim 5 wherein the wide word has 256 bits.

7. An apparatus for processing computer graphics requests, the apparatus comprising:

a graphics request input;

a processor, coupled to the graphics request input, having an output, and responsive to instructions, the processor including a transcendental function generator, the generator having:

a plurality of lookup tables, each table corresponding to a particular transcendental function and containing interpolation coefficients;

an interpolator engine, selectably coupled to one of the plurality of lookup tables.

8. The apparatus as defined by claim 7 further including a multiplexer for enabling the interpolator engine to selectively couple to any one of the plurality of lookup tables.

9. The apparatus as defined by claim 7 wherein each instruction is a wide word.

10. The apparatus as defined by claim 9 wherein each instruction includes up to 256 bits.

11. A graphics processor for processing vertices of a polygon, the graphics processor comprising:

an input for receiving an instruction for processing a given vertex;

memory for storing a plurality of lookup tables that each correspond to a selected function;

an interpolation engine that produces an output value based upon the contents of at least one of the lookup tables and data relating to the given vertex, the different tables being stored in different address ranges of the memory, the instruction having bits that are incorporated into the memory address to enable table selection.

12. A method for processing vertices of a polygon, the method comprising:

receiving an instruction for processing a given vertex with a function;

selectively connecting to a corresponding lookup table containing coefficient values for the function from a group of lookup tables;

selecting coefficient values from the corresponding lookup table based on data representative of the given vertex; and calculating an output in an interpolation engine based on data representative of the given vertex and the coefficient values.

13. The method according to claim 12, wherein the instruction is a wide word.

14. The method according to claim 13, wherein the wide word is at least 128 bits.

15. A method for using a graphics processor to process vertices, the method comprising:

receiving data corresponding to a given vertex into an interpolation engine of a graphics processor;

receiving an instruction corresponding to the given vertex into an interpolation engine of a graphics processor;

accessing at least a first lookup table from a group of lookup tables based on at least part of the instruction;

ascertaining at least a first coefficient value from the first lookup table based on data corresponding to the given vertex; and calculating an output value in the interpolation engine based on the data and the first coefficient value.

16. The method according to claim 15, wherein the step of accessing requires connecting the first lookup table with the interpolation engine based on part of the instruction.

17. The method according to claim 16, wherein the step of accessing results from setting a select input of a multiplexer which connects the interpolation engine to the first lookup table from the group of lookup tables.

18. A method for processing computer graphics requests, the method comprising:

receiving instructions at a graphics request input that is coupled to a transcendental function generator;

selectively accessing, based on one of the instructions, at least one of a group of lookup tables corresponding to a particular transcendental function, each lookup table containing interpolation coefficients;

retrieving interpolation coefficients based on vertex data; and calculating a transcendental function based on the vertex data and the interpolation coefficients.

* * * * *